United States Patent
Miyake

(10) Patent No.: US 9,291,718 B2
(45) Date of Patent: Mar. 22, 2016

(54) ALTITUDE INFORMATION ACQUIRING DEVICE AND ALTITUDE INFORMATION ACQUIRING SYSTEM

(71) Applicant: CASIO COMPUTER CO., LTD., Shibuya-ku, Tokyo (JP)

(72) Inventor: Takeshi Miyake, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 474 days.

(21) Appl. No.: 13/796,117

(22) Filed: Mar. 12, 2013

(65) Prior Publication Data

US 2013/0257650 A1    Oct. 3, 2013

(30) Foreign Application Priority Data

Mar. 27, 2012 (JP) .................. 2012-070695

(51) Int. Cl.

| | |
|---|---|
| G01S 19/48 | (2010.01) |
| G01L 19/08 | (2006.01) |
| G01C 5/06 | (2006.01) |
| G01S 19/14 | (2010.01) |
| G01S 19/34 | (2010.01) |
| G01S 19/39 | (2010.01) |
| G01L 19/00 | (2006.01) |

(52) U.S. Cl.
CPC . *G01S 19/48* (2013.01); *G01C 5/06* (2013.01); *G01L 19/086* (2013.01); *G01S 19/14* (2013.01); *G01S 19/34* (2013.01); *G01S 19/39* (2013.01); *G01L 2019/0053* (2013.01)

(58) Field of Classification Search
CPC ......... G01S 19/48; G01S 19/34; G01S 19/14; G01S 19/39; G01L 2019/0053; G01C 5/06
USPC ................................................... 342/357.31
See application file for complete search history.

(56) References Cited

U.S. PATENT DOCUMENTS

| | | | |
|---|---|---|---|
| 5,646,857 A * | 7/1997 | McBurney et al. ........... 701/475 |
| 6,013,007 A * | 1/2000 | Root et al. .................... 482/8 |
| 2008/0082254 A1* | 4/2008 | Huhtala et al. ............... 701/201 |

FOREIGN PATENT DOCUMENTS

| | | |
|---|---|---|
| JP | 05-172569 A | 7/1993 |
| JP | 2000-283775 A | 10/2000 |
| JP | 2006145340 A * | 6/2006 |
| JP | 2009-118403 A | 5/2009 |

* cited by examiner

*Primary Examiner* — Harry Liu
(74) *Attorney, Agent, or Firm* — Holtz, Holtz & Volek PC

(57) ABSTRACT

An altitude information acquiring device includes a measuring unit which measures atmospheric pressure; a wireless communication unit which performs near field communication with an external device; and an altitude information acquiring unit which acquires altitude information from an external positioning device through the wireless communication unit. An inversion detecting unit detects an inversion of a changing direction of the atmospheric pressure periodically measured by the measuring unit, and a communication control unit controls a timing to acquire the altitude information through the wireless communication unit at a set timing, based on the inversion detected by the inversion detecting unit. An integrated altitude change acquiring unit acquires a rise altitude integrated value obtained by integrating an amount of altitude change in a rising direction and a fall altitude integrated value obtained by integrating an amount of altitude change in a falling direction, based on the acquired altitude information.

19 Claims, 11 Drawing Sheets

ALTITUDE INFORMATION ACQUIRING DEVICE AND ALTITUDE INFORMATION ACQUIRING SYSTEM

CROSS-REFERENCE TO RELATED APPLICATIONS

This application is based upon and claims the benefit of priority from the prior Japanese Patent Application No. 2012-070695, filed Mar. 27, 2012, and the entire disclosure of which are incorporated herein by reference.

BACKGROUND OF THE INVENTION

The present invention relates to an altitude information acquiring device and an altitude information acquiring system for acquiring altitude information.

In recent years, some electronic watches have various measurement sensors mounted thereon so as to display not only time information but also various pieces of information such as various measurement values and calculated values. Further, some electronic watches have radio receiving units to receive radio waves from positioning satellites such as GPS, acquire position information (GPS positioning) and display the position information.

Some electronic watches have one of these types of display functions which can acquire and display altitude data and store a history of altitude changes. Conventionally, such altitude information is acquired by direct acquiring of altitude data by way of GPS positioning, or by indirect acquiring of altitude data using a conversion table between an atmospheric pressure and an altitude set in advance for estimating an altitude based on an atmospheric pressure measurement value measured by a pressure sensor. These altitude acquiring methods include different error factors. Hence, for example, Japanese Patent Application Laid-Open (JP-A) No. 2000-283775 discloses a technique of reducing an error based on a result of comparison of values acquired by using both of the acquiring methods in combination.

Further, there is an electronic watch which can not only simply acquire an altitude value at a point of time of measurement, but also acquire a relative altitude change and altitude history information about a peak position. For example, JP-A No. 5-172569 discloses a technique for performing accumulative calculation of total rise altitudes and total fall altitudes from a predetermined timing, respectively, and displaying them.

Further, in recent years, there is a technique related to the present invention for exchanging information between a plurality of mobile terminals using Bluetooth communication (registered trademark: Bluetooth) as disclosed in, for example, JP-A No. 2009-118403.

However, when obtaining a change of an altitude based on a measurement of the atmospheric pressure, if a user is stopping, moving on a flat road or moving slowly, there is a problem that the change occurs in an opposite direction due to change in weather conditions. On the other hand, applying GPS positioning increases power consumption and it leads a small device such as an electronic wristwatch in particular to become larger.

The present invention provides an altitude information acquiring device and an altitude information acquiring system which can accurately acquire the orientation and the magnitude of movement in an altitude direction while suppressing power consumption.

SUMMARY OF THE INVENTION

One aspect of the present invention is an altitude information acquiring device which includes: a measuring unit which measures an atmospheric pressure; a wireless communication unit which performs near field communication with an external device; an altitude information acquiring unit which acquires altitude information from an external positioning device through the wireless communication unit; an inversion detecting unit which detects an inversion of a changing direction of the atmospheric pressure measured by the measuring unit on a regular basis; a communication control unit which controls a timing to acquire the altitude information through the wireless communication unit at a set timing, based on the inversion detected by the inversion detecting unit; and an integrated altitude change acquiring unit which acquires a rise altitude integrated value obtained by integrating an altitude change amount upon a rise and a fall altitude integrated value obtained by integrating an altitude change amount upon a fall, based on the acquired altitude information.

DESCRIPTION OF THE PREFERRED EMBODIMENT

Hereinafter, embodiments of the present invention will be described based on the drawings.

Figure 1:
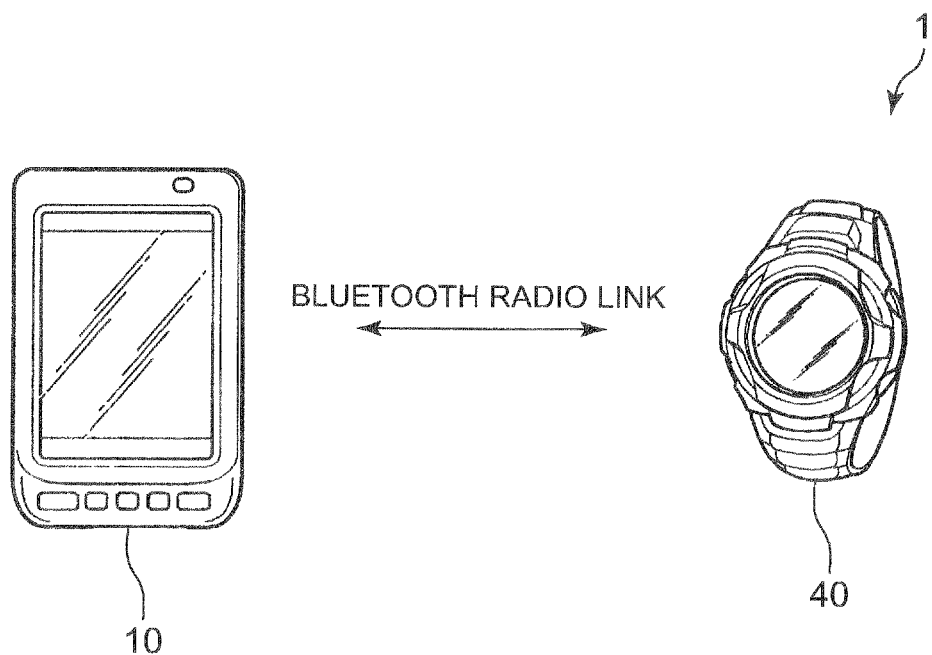
FIG. 1 is a view illustrating an entire configuration of an altitude information acquiring system according to an embodiment of the present invention.

FIG. 1 is a view illustrating an entire configuration of an altitude information acquiring system 1 according to a first embodiment of the present invention.

The altitude information acquiring system 1 according to the present invention includes an electronic watch 40 and a smartphone 10 as a GPS positioning device. The electronic watch 40 is a wristwatch which has a watch body and a band, and can be attached to an arm. The electronic watch 40 and the smartphone 10 include near field communication functions, and, for example, can communicate with each other by way of Bluetooth communication. The smartphone 10 may be put in a bag or a pocket and carried by a user who wears the electronic watch 40.

Figure 2:
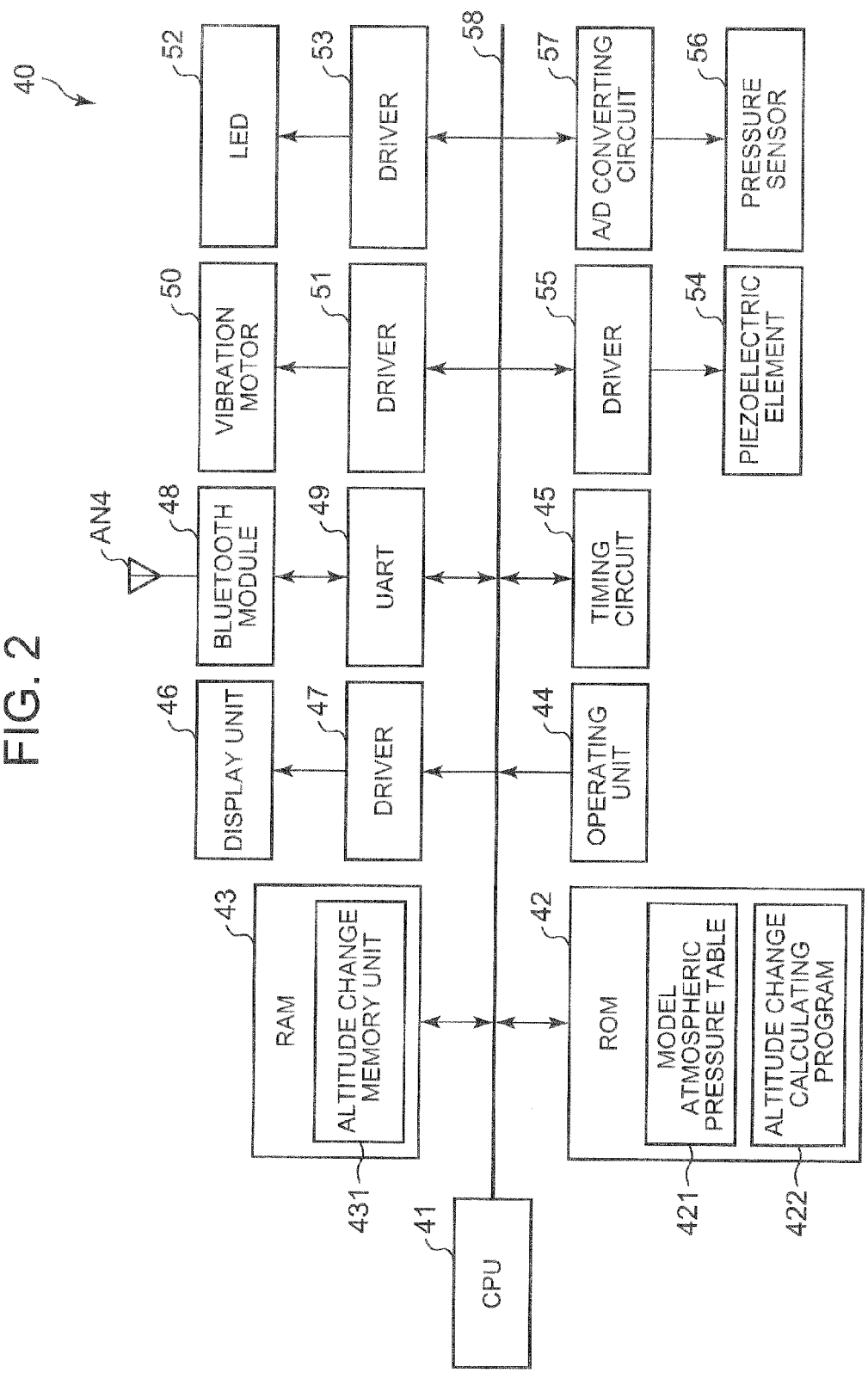
FIG. 2 is a block diagram illustrating an internal configuration of an electronic watch.
Figure 3:
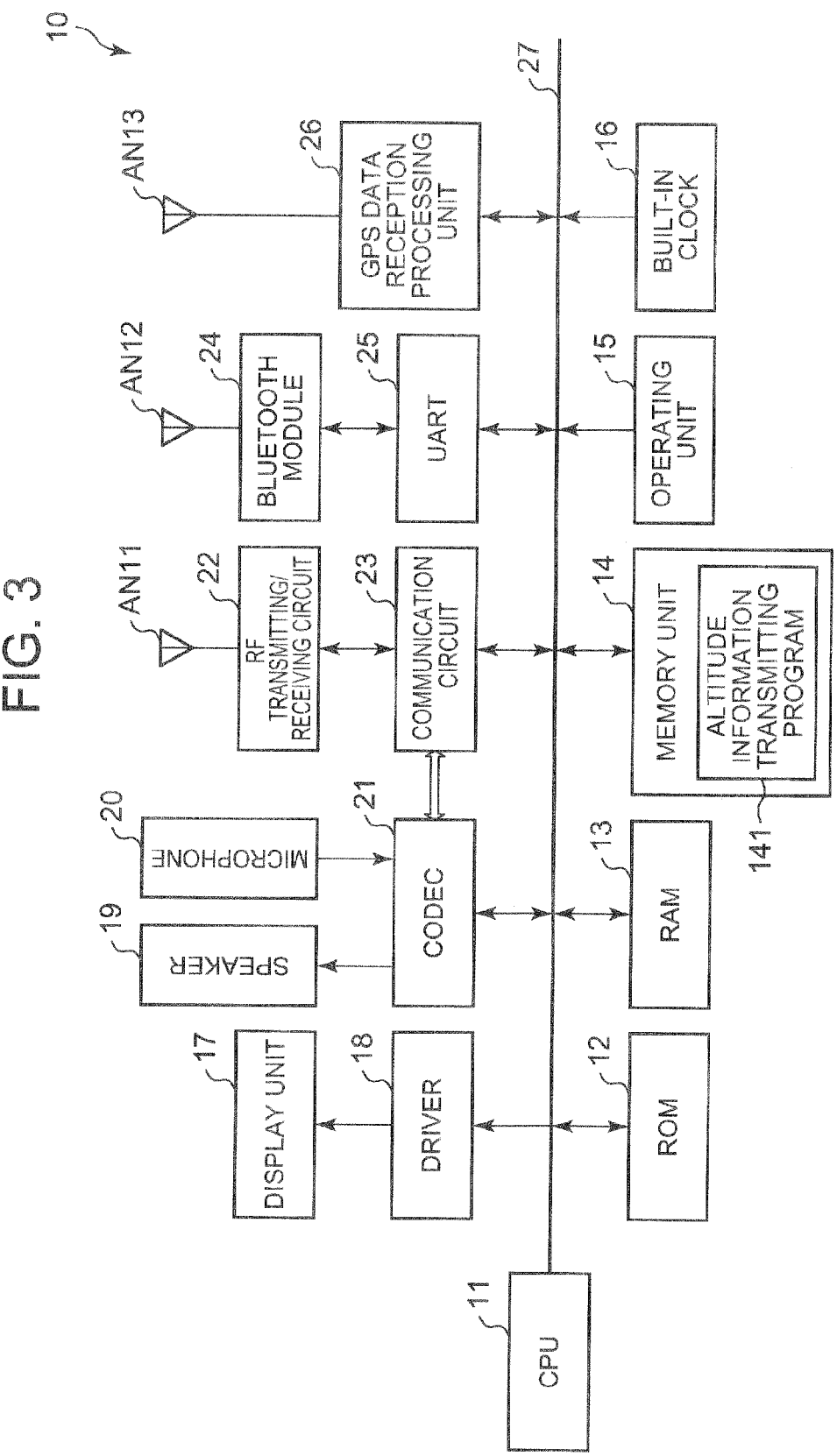
FIG. 3 is a block diagram illustrating an internal configuration of a smartphone.

FIG. 2 is a block diagram illustrating an internal configuration of the electronic watch 40. FIG. 3 is a block diagram illustrating an internal configuration of the smartphone 10.

As illustrated in FIG. 2, the electronic watch 40 includes, for example, a CPU (Central Processing Unit) 41 (an altitude information acquiring unit, an inversion detecting unit, a communication control unit, an integrated altitude change acquiring unit, an altitude calculating unit, and an initial value setting unit), a ROM (Read Only Memory) 42, a RAM (Random Access Memory) 43, an operating unit 44, a timing circuit 45, a display unit 46, a driver 47 which controls driving of the display unit 46, an antenna AN4, a Bluetooth module 48 (a wireless communication unit), a UART (Universal Asynchronous Receiver Transmitter) 49, a vibration motor 50, a driver 51 of the vibration motor 50, a LED (light emitting diode) 52, a driver 53 of the LED 52, a piezoelectric element 54, a driver 55 of the piezoelectric element 54, a pressure sensor 56 (a measuring unit), an A/D converting circuit 57 and a bus 58 which exchanges a signal to and from each of the unit of the CPU 41.

The CPU 41 plays a role to control the entire operation of the electronic watch 40 and performs various types of computation processing. The CPU 41 displays the time on the display unit 46 based on the current time timed by the timing circuit 45. Further, the CPU 41 can calculate an altitude based on atmospheric pressure data acquired by the pressure sensor 56, and acquire predetermined altitude information from the smartphone 10 through the Bluetooth module 48.

The ROM 42 stores various programs executed by the CPU 41 and initial setting data. The data stored in the ROM 42 includes a model atmospheric pressure table 421 and an altitude change calculating program 422. When the CPU 41 executes the altitude change calculating program 422, an integrated moving amount of the electronic watch 40 in a vertical direction is calculated.

The RAM 43 provides a working memory space for the CPU 41. The RAM 43 includes the altitude change memory unit 431 and separately stores magnitudes of integrated altitude changes upon rising and falling as a value of integrated risen altitude (rise altitude integrated value) and a value of integrated fallen altitude (fall altitude integrated value). Here, arise altitude integrated value and a fall altitude integrated value to be stored are not limited to a pair. It is possible to hold and set a plurality of pairs of values and switch between the values according to a user's input operation to the operating unit 44.

The operating unit 44 includes one or more of button switches and converts a user's operation with respect to the switch into an electrical signal and outputs the electrical signal to the CPU 11. Alternatively, this operating unit 44 may be a touch detecting unit which uses the display unit 46 as a touch panel.

The timing circuit 45 is a counter which counts and holds the current time. This current time is read and displayed on the display unit 46 or current time data and set time data related to various functions are compared and various operations are performed.

The display unit 46 is, for example, a LCD (Liquid Crystal Display) of a segment display type. The driver 47 (liquid crystal driver) is activated by a control signal sent from the CPU 41 and drives the LCD to display specified content such as a current time, a setting status or a menu of various functions. The display unit 46 may be, for example, another type of display unit such as an organic ELD (Electro-Luminescent Display), and the driver 47 is adequately selected according to the type of the display unit 46.

The Bluetooth module 48 is a control module for performing Bluetooth communication with an external device through the antenna AN4. It is possible to apply a low power consumption standard (Bluetooth Low Energy) for the Bluetooth module 48. The transmission data sent from the CPU 41 is, for example, converted in serial/parallel form by the UART 49, and transmitted from the Bluetooth module 48 to the external device. Received data received from the external device using the Bluetooth module 48 is, for example, converted in serial/parallel by the UART 49, and outputted to the CPU 41.

The vibration motor 50, the LED (Light Emitting Diode) 52 and the piezoelectric element (PZT) 54 provide notifications to a user by causing vibration, emitting light and emitting a buzzer sound, respectively. When control signals are sent from the CPU 41 to the drivers 51, 53 and 55, respectively, the drivers 51, 53 and 55 convert the control signals into voltage signals which are required to operate the vibration motor 50, the LED 52 and the piezoelectric element 54 and output the voltage signals.

As illustrated in FIG. 3, the smartphone 10 includes, for example, a CPU 11 (an altitude change amount calculating unit), a ROM 12, a RAM 13 (an altitude history memory unit), a memory unit 14, an operating unit 15, a built-in clock 16, a display unit 17, a driver 18 of the display unit 17, a speaker 19, a microphone 20, a codec 21, a RF transmitting/receiving circuit 22, a RF transmitting/receiving antenna AN11, a communication circuit 23, a Bluetooth module 24 as an external wireless communication unit, a UART 25, a transmitting/receiving antenna AN12 for Bluetooth communication, a GPS data reception processing unit 26 as an altitude acquiring unit, a receiving antenna AN13 for GPS data, and a bus 27 which connects the CPU 11 and each unit.

The CPU 11 plays a role to control the entire operation of the smartphone 10, and performs various types of computation processing. The CPU 11 sends a control signal to the Bluetooth module 24 based on setting information resulting from an input operation with respect to the operating unit 15, and makes the Bluetooth module 24 send altitude information based on GPS positioning data to the electronic watch 40.

The ROM 12 stores various programs to be executed by the CPU 11 and initial setting data. The RAM 13 provides a working memory space for the CPU 11, and stores temporary data for working.

The memory unit 14 is a non-volatile read/write memory, and is, for example, a flash memory or an EEPROM (Electrically Erasable and Programmable Read Only Memory). In the memory unit 14, for example, various application programs to be executed by the smartphone 10 and stored-data and setting data related to various functions are stored. The application program includes an altitude information transmitting program 141 for outputting altitude information, required from the electronic watch 40, in a predetermined format by way of Bluetooth communication to the electronic watch 40 through the Bluetooth module 24.

The operating unit 15 detects operation input performed by touching the display unit 17 used as a touch panel. The operating unit 15 converts operation content inputted by way of touching by the user based on the menu displayed on the display unit 17, into an electrical signal, and outputs the electrical signal as the input signal to the CPU 11. Alternatively, this operating unit 15 may be provided with a plurality of operation keys, and output an electrical signal generated based on a user's operation performed with respect to the key, to the CPU 11 as an input signal.

The built-in block 16 is a counter which counts and holds the current time. The current time is read and displayed on the display unit 17. The current time data and set time data related to various functions are compared, and various operations are performed. The current time data of the built-in clock 16 is occasionally corrected upon communication with a mobile base station through the RF transmitting/receiving circuit 22.

The display unit 17 is, for example, a LCD (Liquid Crystal Display). The driver 18 (liquid crystal driver) is operated according to the control signal sent from the CPU 11, and the driver 18 drives the LCD to display various functions of the smartphone 10. The display unit 17 may adopt, for example, another system such as an organic ELD (Electro-Luminescent Display), and the driver 18 is adequately selected according to a display system. The display unit 17 as the touch panel displays the menu for allowing the user to perform an input operation.

The speaker 19 converts an electrical signal into an audio signal based on the signal from the codec 21, and outputs an audio sound. The microphone 20 detects a sound wave, converts the sound wave into an electrical signal, and outputs the electrical signal to the codec 21. The codec 21 decodes an encoded and compressed digital audio signal, sends the digital sound signal to the speaker 19 as an analog signal, encodes an audio signal acquired from the microphone 20 and outputs the audio signal to the CPU 11 and the communication circuit 23. In addition, a speaker for communication and a speaker for outputting an audio sound to outside may be provided separately.

The RF transmitting/receiving circuit 22 performs transmission/reception processing of telephone communication and packet communication such as electronic mails to and from a mobile base station using the RF transmitting/receiving antenna AN11. The communication circuit 23 performs various types of processing of transmission/received data transmitted and received by the RF transmitting/receiving circuit 22, and exchanges data to and from the CPU 11 and the codec 21.

The Bluetooth module 24 is a control module for performing Bluetooth communication with another electronic device such as the electronic watch 40 through the antenna AN12. The transmission data sent from the CPU 11 is converted, for example, in serial/parallel form by the UART 25, and transmitted from the Bluetooth module 24 to the another electronic device. Received data received from another electronic device using the Bluetooth module 24 is converted, for example, in parallel/serial by the UART 25, and outputted to the CPU 11.

The GPS data reception processing unit 26 demodulates and decodes a satellite signal received from a GPS positioning satellite through the antenna AN13, converts the satellite signal into time data or position data, and outputs the time data or the position data in a predetermined format to the CPU 11. For the predetermined format of the output, for example, NMEA (National Marine Electronics Association)-0183 is used.

Next, an operation of the electronic watch 40 according to the embodiment for acquiring altitude information will be described.

The electronic watch 40 according to the embodiment uses altitude data continuously acquired by converting an atmospheric pressure measured by the pressure sensor 56 into an altitude value based on the model atmospheric pressure table 421, and altitude data acquired based on the GPS data received by the GPS data reception processing unit 26 of the smartphone 10 in combination. Although the small and light pressure sensor 56 can measure the altitude with low power consumption, the calculated altitude value includes an error the degree of which changes depending on weather conditions. Then, when detecting that the change of an altitude value is a local maximum or a local minimum caused by user's movement, the electronic watch 40 requests the smartphone 10 to acquire GPS data, and receive altitude information related to this acquired data and acquire accurate altitude information. Since receiving a radio wave from the GPS satellite or performing computation processing increase power consumption, an operation of receiving a radio wave from the GPS satellite is performed at a necessary frequency. That is, the electronic watch 40 itself does not receive GPS data, and the smartphone receives GPS data at the minimum request.

The electronic watch 40 stores a cumulative value of an amount of movement in at least the vertical direction (altitude direction) in the altitude change memory unit 431, and holds the cumulative value. The altitude changes measured during an altitude measurement period are acquired separately in a rise direction and a fall direction and are accumulated separately. Values of these integrated rise altitude and integrated fall altitude may be configured to be initialized according to a user's command or setting through an input operation with the operating unit 44 and reset every time the altitude measurement period starts or may be calculated by counting a cumulative value from start of the operation of the electronic watch 40 without resetting data.

[First Embodiment]

Figure 4:
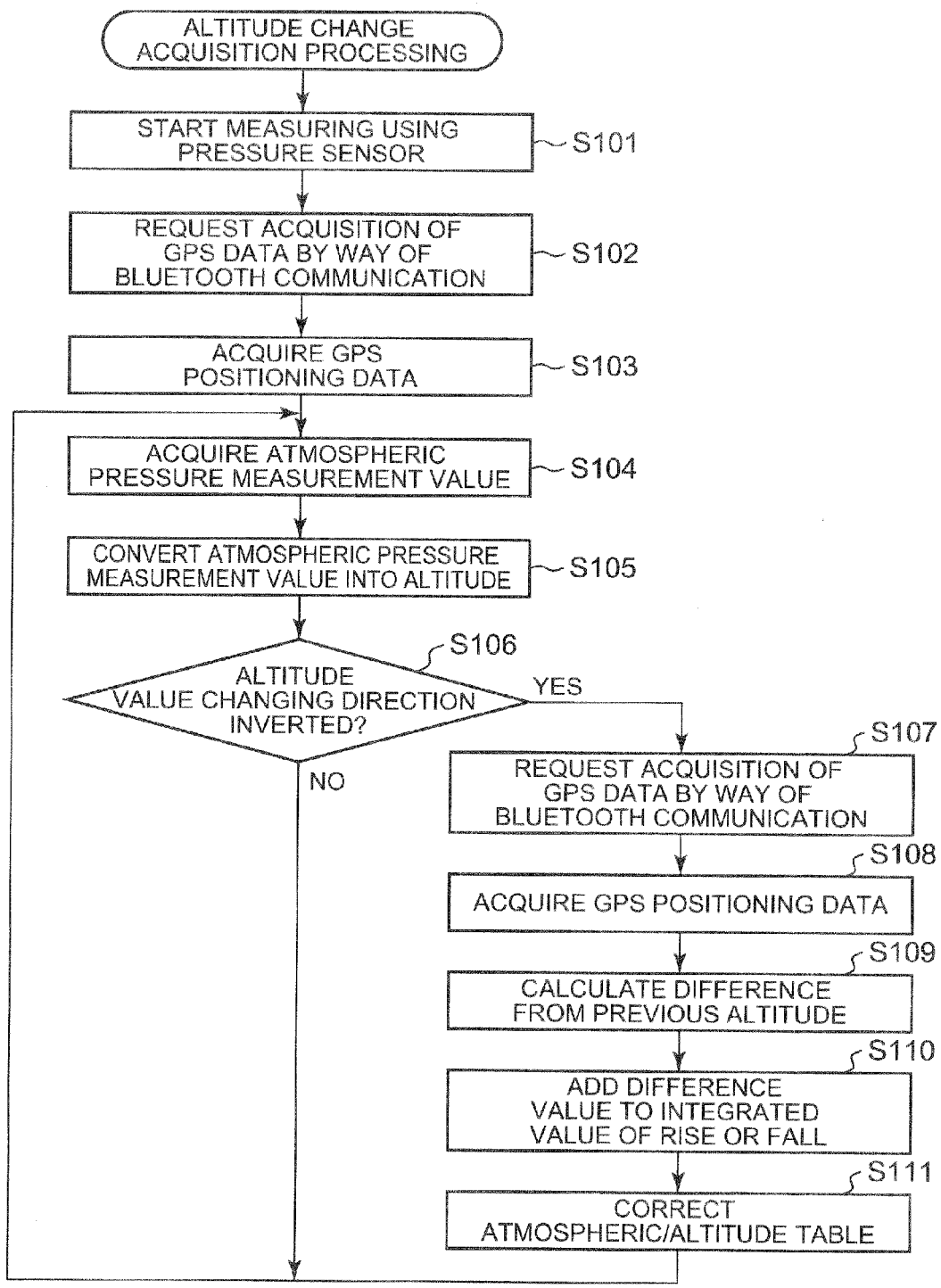
FIG. 4 is a flowchart illustrating control procedure of altitude change acquisition processing according to a first embodiment.

FIG. 4 is a flowchart illustrating control procedure of the CPU 41 in altitude change acquisition processing according to a first embodiment in the electronic watch 40.

This altitude change acquisition processing is started when, for example, a user inputs an operation to the operating unit 44, and is repeatedly executed until the processing is ended according to an input of the operation.

When the altitude change acquisition processing is started, the CPU 41 first starts acquiring atmospheric pressure data from the pressure sensor 56 (step S101). Subsequently, the CPU 41 requests a smartphone 10 to acquire and transmit GPS positioning data through the Bluetooth module 48 (step S102). The CPU 41 stands by until the smartphone 10 transmits data, and acquires the transmitted GPS positioning data (step S103). The CPU 41 stores only altitude information among positioning data in association with time data in the altitude change memory unit 431 of the RAM 43 or the like. Further, in this case, the CPU 41 can use the acquired altitude information as a correction parameter of the model atmospheric pressure table 421.

Next, the CPU 41 acquires a measurement value of the atmospheric pressure from the pressure sensor 56 at a predetermined time interval (step S104). Then, the CPU 41 performs calculation processing for converting the acquired measurement value into an altitude value using the model atmospheric pressure table 421 (step S105). The CPU 41 calculates a difference between the calculated altitude value and the previously calculated altitude value, that is, calculates an amount of altitude change, and further decides whether or not the sign of this amount of altitude change is inverted from the sign of a previously calculated amount of altitude change (step S106). In the processing of steps S105 and S106, the inversion of the changing direction is focused upon and therefore it may be determined based on the inversion of the changing direction of atmospheric pressure whether or not the sign is inverted without converting a measurement value into an altitude value.

When it is decided that the sign of the altitude change amount is inverted, the CPU 41 requests the smartphone 10 to acquire and transmit GPS positioning data through the Bluetooth module 48 (step S107). The CPU 41 stands by until data is received from the smartphone 10, and acquires GPS positioning data received by the Bluetooth module 48 (step S108).

The CPU 41 calculates a difference between an altitude value included in the GPS positioning data previously acquired from the smartphone 10 and an altitude value currently acquired from the smartphone 10 (step S109). The CPU 41 adds the difference value to a rise altitude integrated value stored in the altitude change memory unit 431 when this difference value is positive, and adds the difference value to a fall altitude integrated value stored in the altitude change memory unit 431 when the difference value is negative (step S110).

The CPU 41 updates a correction parameter of the model atmospheric pressure table 421 based on the altitude value acquired from the smartphone 10 (step S111), sends a control signal to the driver 47 so as to display the current altitude value, the rise altitude integrated value and the fall altitude integrated value on the display unit 46. Then, the processing of the CPU 41 returns to the processing of step S104. In this case, only the latest altitude value based on GPS positioning may be stored and the rest of the acquired altitude values may be erased or data after a predetermined timing may be held as history data.

When it is decided in processing in step S106 that the sign of the amount of altitude change is not inverted, the processing of the CPU 41 returns to the processing of step S104.

Meanwhile, when the processing in step S111 or step S106 returns to the processing of step S104, the altitude value and the amount of altitude change currently calculated based on atmospheric pressure data are rewritten and updated as the previous altitude value and altitude change amount.

Figure 5:
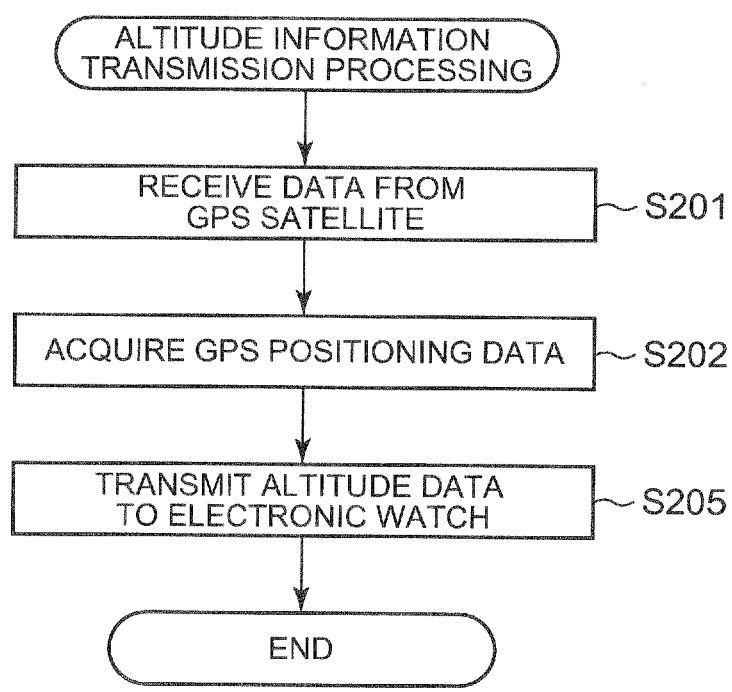
FIG. 5 is a flowchart illustrating control procedure of altitude information transmission processing in the smartphone.

FIG. 5 is a flowchart illustrating control procedure of the CPU 11 in altitude information transmission processing executed in the smartphone 10 corresponding to the altitude change acquisition processing.

When the smartphone 10 receives a GPS data acquisition request from the electronic watch 40, the CPU 11 invokes an altitude information transmitting program and starts the altitude information transmission processing.

The CPU 11 first activates the GPS data reception processing unit 26, and receives a radio wave from the GPS satellite (step S201). Subsequently, the CPU 11 acquires positioning data calculated by the GPS data reception processing unit 26 (step S202). The CPU 11 transmits only altitude data among the positioning data to the electronic watch 40 by means of the Bluetooth module 24 (step S205). The CPU then terminates the altitude information transmission processing.

As explained above, in the altitude change acquisition processing according to the first embodiment in the electronic watch 40, the pressure sensor 56 and the Bluetooth module 48 are used. An inversion of a changing direction of the atmospheric pressure continuously measured by the pressure sensor 56 is detected to request the smartphone 10 by way of Bluetooth communication through the Bluetooth module 48 to execute GPS positioning and transmit altitude data obtained by GPS positioning. Further, a difference between the acquired altitude data and altitude data previously acquired by GPS positioning is calculated, and the difference value is added to the rise altitude integrated value or the fall altitude integrated value according to the sign of this difference value. Consequently, the electronic watch 40 itself does not need to employ a configuration related to GPS positioning and it is possible to acquire accurate altitude data easily while suppressing power consumption and avoiding the electronic watch 40 becomes larger.

Further, the altitude data by way of GPS positioning is obtained only at a site which is determined to be a local maximum point or a local minimum point of the altitude change based on the pressure sensor 56, so that the smartphone 10 does not need to perform GPS positioning more than necessary, either. That is, it is also possible to suppress power consumption of the smartphone 10.

In addition, only altitude data obtained by GPS positioning is used to calculate integrated altitude data, so that there is no problem even when altitude data calculated by the pressure sensor 56 includes an error due to change in weather conditions. Furthermore, the pressure sensor 56 is used only to determine a local maximum or a local minimum, and accurate altitude data can be acquired by way of GPS positioning. Therefore, even when the weather condition changes while the user stops moving, and the altitude change seemingly becomes the local maximum or the local minimum, an accurate altitude change amount is calculated by GPS positioning, so that an error value is not added to an integrated altitude value.

Moreover, an error of the model atmospheric pressure table 421 can be estimated by comparing the accurate altitude value acquired by GPS positioning and an altitude value based on a measurement value of the pressure sensor 56 at this point of time, so that it is possible to update a correction parameter. By this means, it is possible to display an accurate value when an altitude value is displayed in real time together with an integrated altitude value.

Further, an electronic wristwatch which can be attached to an arm can acquire and display an integrated altitude value instead of the smartphone 10 so that the user can easily check an integrated altitude value even in a situation in which the user has difficulty in holding a mobile device such as the smartphone 10, for example, upon climbing a mountain, riding a mountain bike or skiing.

MODIFIED EXAMPLE 1

Next, altitude change acquisition processing according to Modified Example 1 will be described.

Figure 6:
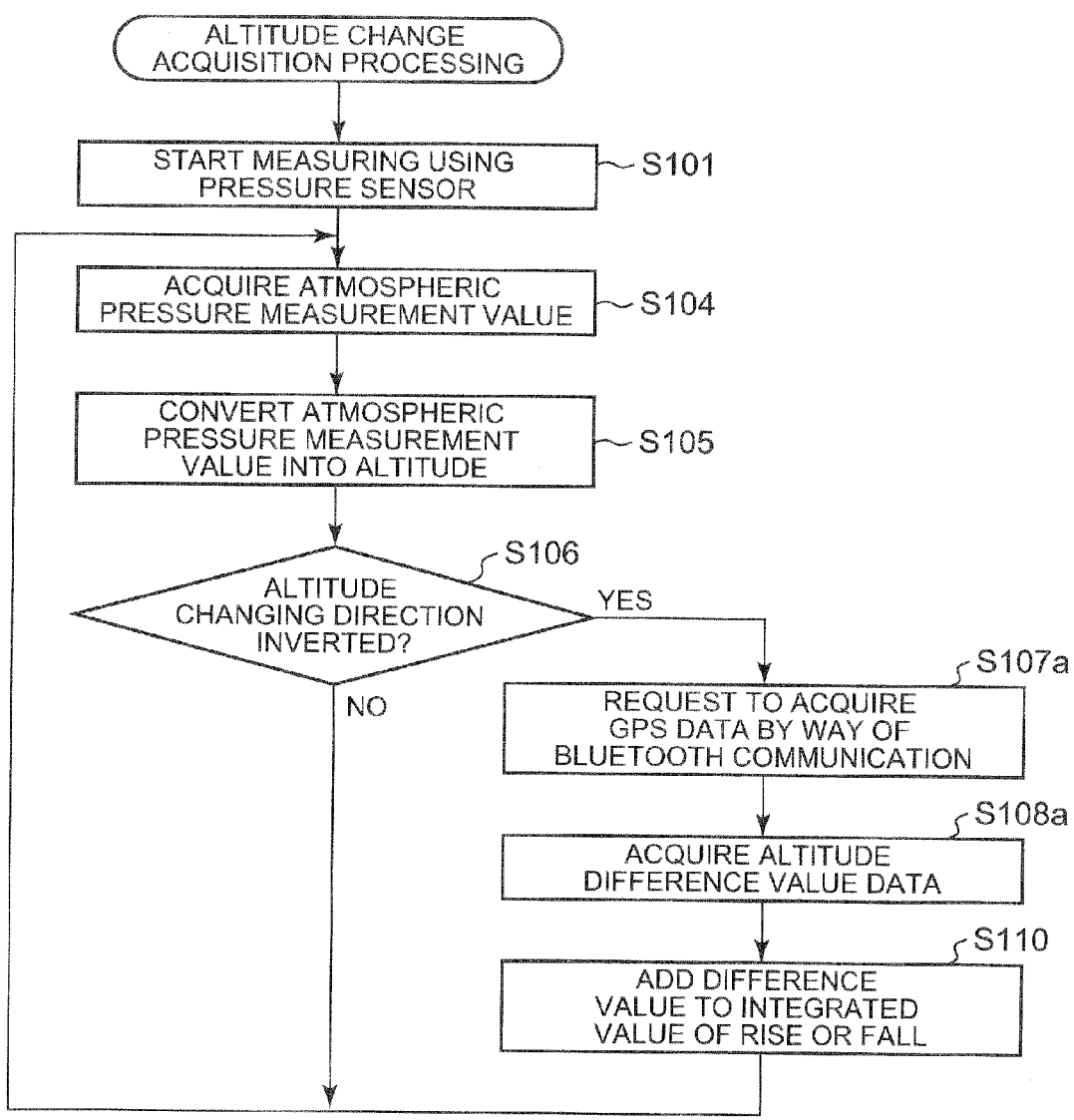
FIG. 6 is a flowchart illustrating control procedure of altitude change acquisition processing according to Modified Example 1.
Figure 7:
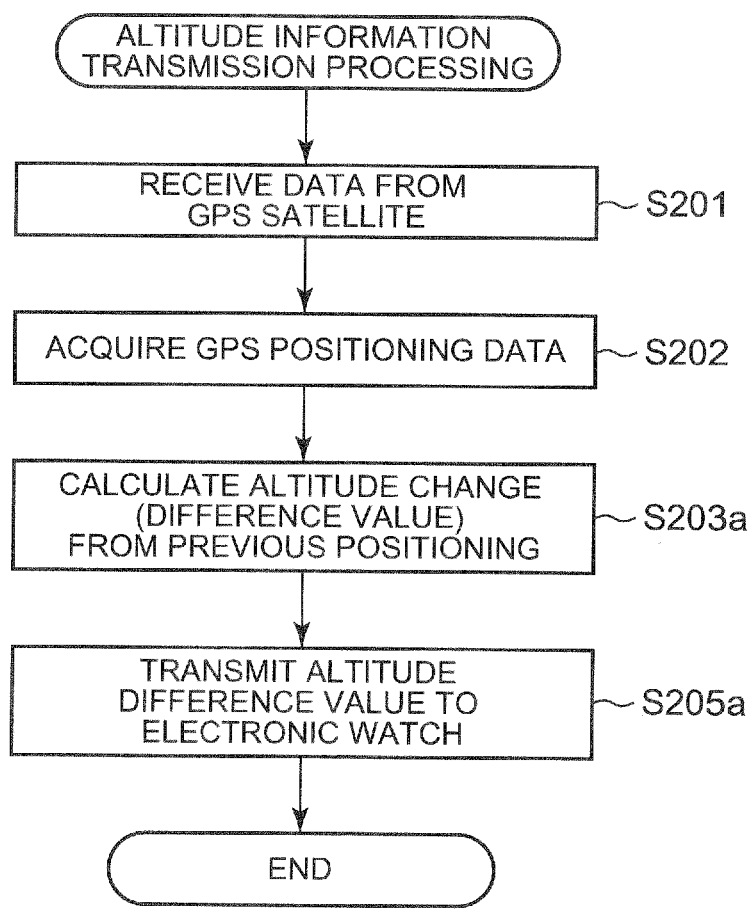
FIG. 7 is a flowchart illustrating control procedure of altitude information transmission processing according to Modified Example 1.

FIG. 6 is a flowchart illustrating control procedure of a CPU 41 in the altitude change acquisition processing according to Modified Example 1 in an electronic watch 40. FIG. 7 is a flowchart illustrating control procedure of a CPU 11 in altitude information transmission processing executed by a smartphone 10 corresponding to the altitude change acquisition processing according to Modified Example 1.

As illustrated in FIG. 6, in the altitude change acquisition processing according to this Modified Example 1, the processing in steps S102, S103, S109 and S111 in altitude change acquisition processing according to the first embodiment is skipped, and the processing in steps S107 and S108 is changed to processing in steps S107a and S108a. The other processing is the same and thus the same reference numerals are assigned and detailed explanation is omitted.

In the altitude change acquisition processing according to Modified Example 1, the step of requesting to acquire GPS positioning data upon start of processing and the step of acquiring data are not performed. When it is decided in the determination processing of step S106 that a change of an altitude value calculated from measurement data of a pressure sensor 56 is inverted from negative to positive or vice versa, the CPU 41 requests the smartphone 10 through a Bluetooth module 48 to acquire GPS data and transmit altitude information (step S107a). As described below, the CPU 41 acquires a difference value from a previous GPS altitude already calculated as altitude information by the smartphone 10 (step S108a). Further, the CPU 41 adds the difference value to a rise altitude integrated value stored in an altitude change memory unit 431 when the acquired difference value is positive, and adds the difference value to a fall altitude integrated value stored in the altitude change memory unit 431 when the difference value is negative. Furthermore, the CPU 41 sends a control signal to a driver 47, causes a display unit 46 to display the rise altitude integrated value and the fall altitude integrated value and returns processing to step S104.

To continuously display an altitude value on the display unit 46, the CPU 41 may perform the processing of steps S102 and S103, and update a correction parameter of a model atmospheric pressure table 421 by acquiring the altitude value itself in the processing of step S108a. Alternatively, to display an altitude value only at the timing of displaying the rise altitude integrated value and the fall altitude integrated value, it is only necessary to acquire the altitude value in the processing of step S108a and cause the display unit 46 to display this altitude value as is.

As illustrated in FIG. 7, in the altitude information transmission processing executed by the smartphone 10, processing in step S203a is added to altitude information transmission processing according to the first embodiment, and the processing of step S205 is changed to processing of step S205a. The other processing is the same as the altitude information transmission processing according to the first embodiment and thus the same reference numerals are assigned and detailed explanation is omitted.

When acquired an altitude of a current position by way of GPS positioning, the CPU 11 calculates an altitude change amount (difference value) from an altitude of a previous GPS positioned point stored in a RAM 13 to the altitude of the current position (step S203a), and transmits the difference value to the electronic watch 40 through a Bluetooth module 24 (step S205a). The CPU 11 then terminates the altitude change calculation processing.

As described above, in the altitude change acquisition processing according to this Modified Example 1, the electronic watch 40 first causes the smartphone 10 to calculate the amount of altitude change and acquires the amount of altitude change, so that it is possible to reduce the calculation load of the CPU 41 of the electronic watch 40.

MODIFIED EXAMPLE 2

Next, altitude change acquisition processing according to Modified Example 2 will be described.

Figure 8:
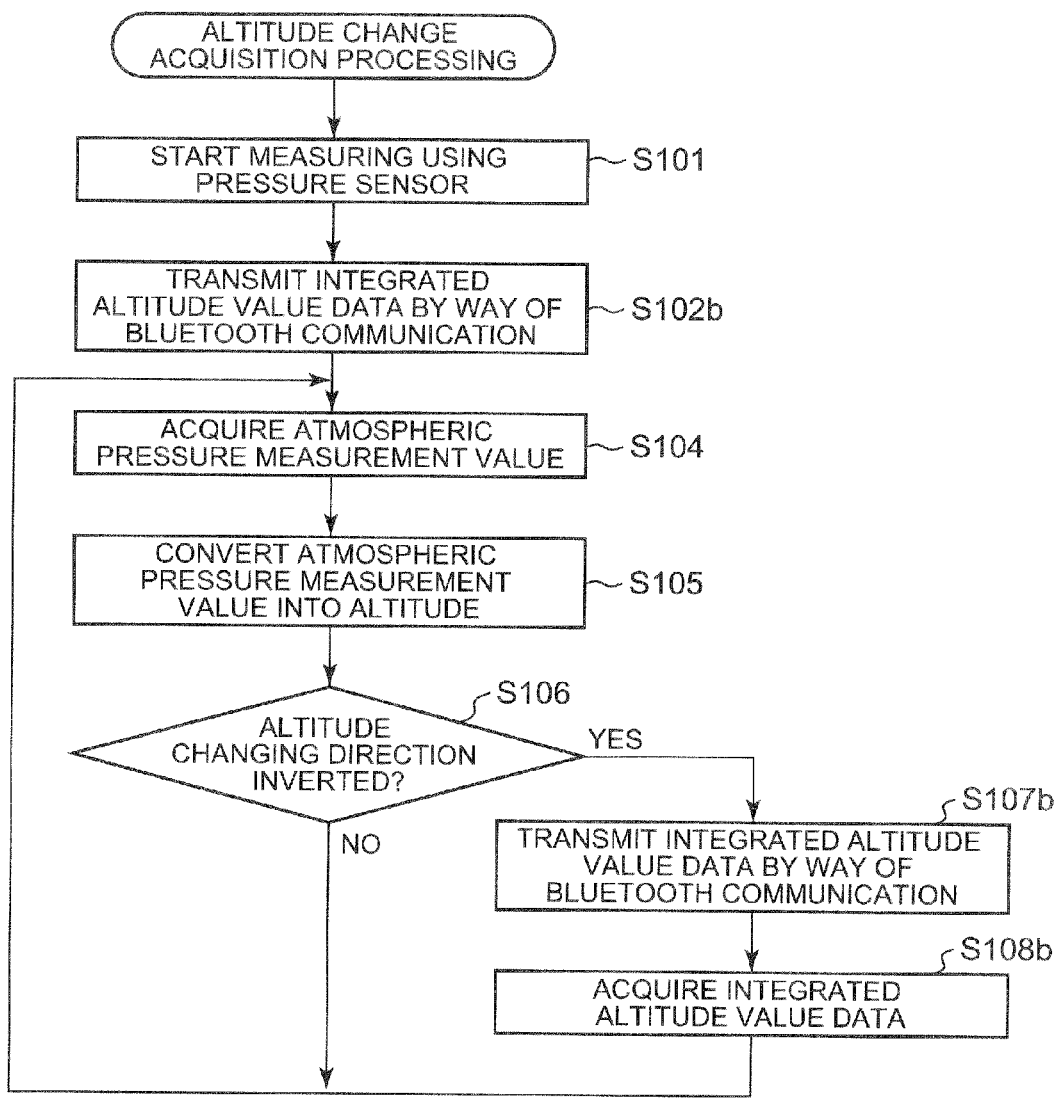
FIG. 8 is a flowchart illustrating control procedure of altitude change acquisition processing according to Modified Example 2.
Figure 9A:
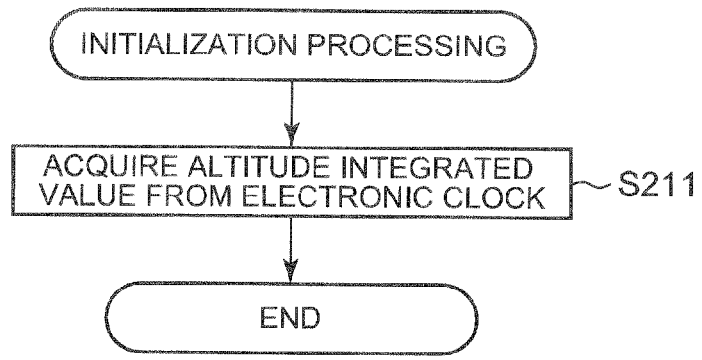
FIGS. 9A and 9B are flowcharts illustrating control procedure of altitude information transmission processing according to Modified Example 2.
Figure 9B:
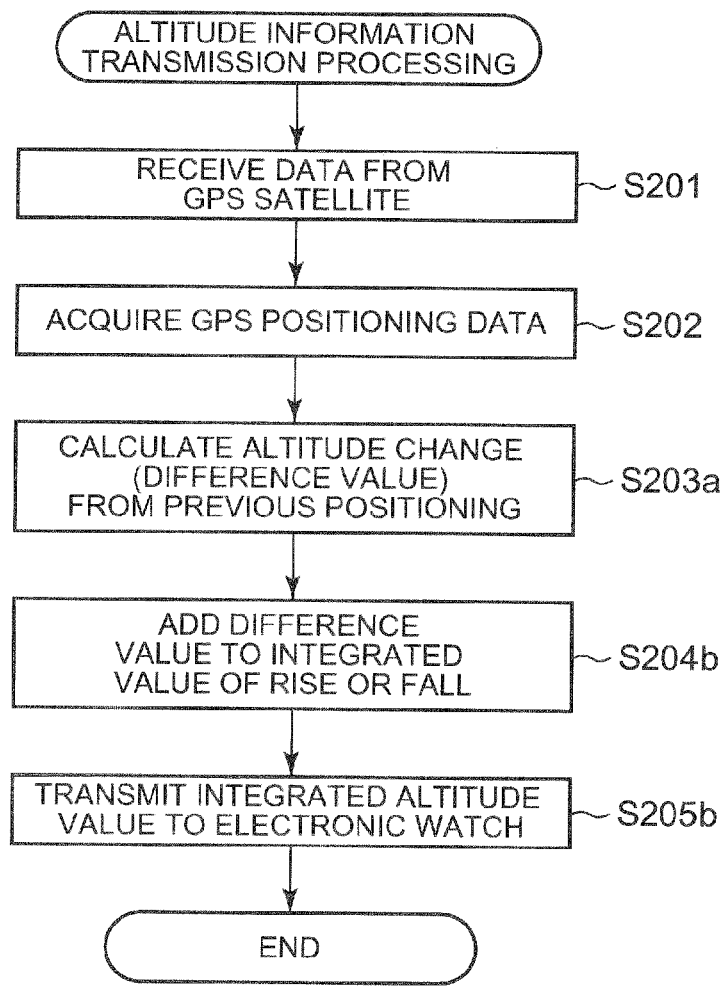

FIG. 8 is a flowchart illustrating control procedure of a CPU 41 in the altitude change acquisition processing according to Modified Example 2 in an electronic watch 40. FIGS. 9A and 9B are flowcharts illustrating control procedure of a CPU 11 in initialization processing and altitude information transmission processing executed by a smartphone 10 corresponding to the altitude change acquisition processing according to Modified Example 2.

As illustrated in FIG. 8, in the altitude change acquisition processing according to the Modified Example 2, the processing of steps S103, S109, S110 and S111 in the altitude change acquisition processing according to the first embodiment is skipped, and processing of steps S102, S107 and S108 is changed to processing of steps S102b, S107b and S108b. The other processing is the same and thus the same reference numerals are assigned and detailed explanation is omitted.

In the altitude change acquisition processing according to Modified Example 2, the CPU 41 transmits integrated altitude value data stored in an altitude change memory unit 431 to the smartphone 10 through a Bluetooth module 48 upon start of the processing (step S102b). When it is decided in the determination processing of step S106 that a change of an altitude value calculated from measurement data of a pressure sensor 56 is inverted from negative to positive or vice versa, the CPU 41 requests the smartphone 10 through the Bluetooth module 48 to acquire GPS data and calculate and transmit integrated altitude value (step S107b). As described below, the CPU 41 acquires the integrated altitude value calculated by the smartphone 10 (step S108b). The CPU 41 stores the acquired integrated altitude value in the altitude change memory unit 431, and sends a control signal to a driver 47 so as to cause a display unit 46 to display the rise altitude integrated value and the fall altitude integrated value and returns the processing to step S104.

As illustrated in FIG. 9A, when the smartphone 10 receives the integrated altitude value from the electronic watch 40, the CPU 11 performs processing of storing this value in a RAM 13 as an initial setting (step S211). Further, when receiving from the electronic watch 40 a request to transmit integrated altitude data, the CPU 11 starts the altitude information transmission processing. As illustrated in FIG. 9B, the altitude information transmission processing according to the Modified Example 2 is the same as the altitude information transmission processing according to Modified Example 1 except that processing of step S204b is added and the processing of step S205a is changed to processing of step S205b. Thus, the same reference numerals are assigned to the same processing and detailed explanation is omitted.

In the processing of step S203a, when an amount of altitude change (difference value) from an altitude at a previous GPS positioning point to an altitude at a current positioning point is calculated, the CPU 11 adds the difference value to the rise altitude integrated value stored in the RAM 13 when the difference value is positive. When the difference value is negative, the difference value is added to the fall altitude integrated value stored in the RAM 13 (step S204b). The CPU 11 transmits these rise altitude integrated value and fall altitude integrated value to the electronic watch 40 through the Bluetooth module 24 (step S205b). The CPU 11 then terminates the altitude change calculation processing.

The altitude change acquisition processing according to the Modified Example 2 can also be configured such that the CPU 41 of the electronic watch 40 updates the correction parameter of the model atmospheric pressure table 421 or causes the display unit 46 to display an altitude value by acquiring the altitude value itself from the smartphone 10 by way of GPS positioning.

As described above, in the altitude change acquisition processing according to Modified Example 2, the rise altitude integrated value and the fall altitude integrated value are also calculated by the smartphone 10 and the electronic watch 40 only acquires the data, so that the CPU 41 does not need to perform substantial calculation processing.

Further, the electronic watch 40 transmits an integrated altitude value to the smartphone 10 upon start of measurement to make an initial setting, so that, even when the electronic watch 40 cumulatively uses an integrated altitude value for a plurality of events, that is, for a mountain climbing on a different day, or the smartphone 10 performs the same processing for a plurality of electronic watches 40, the smartphone 10 can easily calculate the integrated altitude value. Furthermore, even when the electronic watch 40 holds tables of a plurality of integrated altitude values and the integrated altitude values are switched based on separate data for skiing and mountain biking, for example, the smartphone 10 can easily calculate each integrated altitude values.

[Second Embodiment]

Next, an altitude information acquiring system 1 according to a second embodiment will be described.

A configuration of the altitude information acquiring system 1 according to the second embodiment is the same as an altitude information acquiring system according to the first embodiment, and thus the same reference numerals are assigned and detailed description is omitted.

Figure 10:
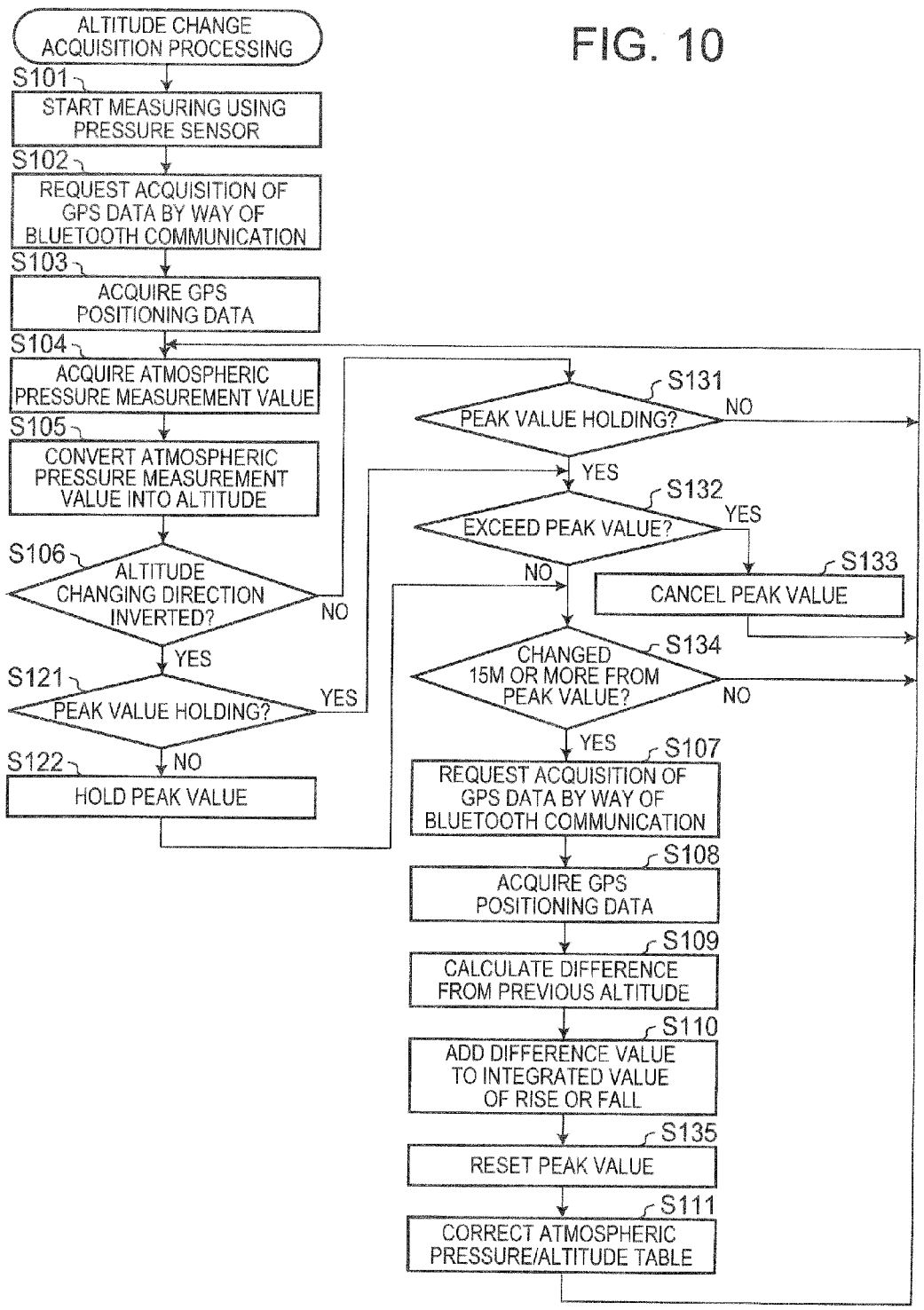
FIG. 10 is a flowchart illustrating control procedure of altitude change acquisition processing according to a second embodiment.

FIG. 10 is a flowchart describing control procedure of a CPU 41 in altitude change acquisition processing according to a second embodiment in an electronic watch 40.

In the altitude change acquisition processing according to the second embodiment, processing of steps S121 and S122 and steps S131 to S135 are added to the altitude change acquisition processing according to the first embodiment. The other processing is the same, and thus the same reference numerals are assigned and detailed description is omitted.

In the altitude change acquisition processing according to the embodiment, when an altitude change inverted from positive to negative or vice versa in the processing of step S106, an altitude value upon inversion is held, a predetermined altitude change is measured and it is decided whether or not this peak altitude is a local maximum or a local minimum.

When it is decided in the processing of step S106 that the sign (positive/negative) of the altitude change is not inverted, the CPU 41 next decides whether or not a RAM 43 holds peak value data (step S131). When it is decided that the peak value data is not held, the processing of the CPU 41 returns to step S104 as is. When it is decided that the peak value data is held, the processing of the CPU 41 goes to step S132.

When it is decided in the processing of step S106 that the sign (positive/negative) of the altitude change is not inverted, the CPU 41 next decides whether or not the RAM 43 has already held peak value data (step S121). When it is decided that the peak value data is held, the processing of the CPU 41 goes to step S132. When it is decided that the peak value is not held, the CPU 41 acquires as a peak value an altitude value based on previous measurement data of a pressure sensor 56, and stores the peak value in the RAM 43 (step S122). In this case, the CPU 41 stores in the RAM 43 whether the peak value is a local maximum value or a local minimum value. The processing of the CPU 41 then goes to step S134.

When the step goes to the processing of step S132, the CPU 41 determines whether or not a currently calculated value is larger in a peak direction than the peak value currently held. That is, the CPU 41 decides whether the peak value is the local maximum value and the currently calculated value is larger than this peak value or the peak value is the local minimum value and the currently calculated value is smaller than this peak value. When it is decided that the calculated value is larger than the local maximum peak value or smaller than the local minimum peak value, the CPU 41 cancels the peak value currently held (step S133), and returns the processing to step S104. When it is decided that the calculated value is the same or smaller than the local maximum peak value or the same or larger than the local minimum peak value, the processing of the CPU 41 goes to step S134.

When the processing goes to the processing of step S134, the CPU 41 decides whether or not the currently calculated value is a predetermine value (for example, 15 m) or more apart in an opposite direction from the peak of the currently held peak value. That is, the CPU 41 decides whether or not the peak value is the local maximum value and the currently calculated value is the predetermined value or more smaller than the peak value or the peak value is the local minimum value and the currently calculated value is the predetermined value or more larger than the peak value. When it is decided that a shift from a local maximum peak value is less than a predetermined value or a shift from a local minimum peak value is less than a predetermined value, the processing of the CPU 41 goes to step S104.

When it is decided that the currently calculated value is a predetermined value or more smaller than the local maximum peak value or a predetermined value or more larger than the local minimum peak value, the CPU 41 causes to communicate with the smartphone 10 through the Bluetooth module 48 and acquires GPS positioning date (step S107), and adds to the rise altitude integrated value or the fall altitude integrated value the difference value calculated based on the acquired altitude data and the altitude previously obtained by GPS positioning (steps S108 to S110). When this processing is terminated, the CPU 41 resets the peak value (step S135). The processing of the CPU 41 then goes to step S111.

The predetermined value set in the embodiment can be set to, for example, a value corresponding to an altitude error corresponding to an error of the atmospheric pressure calculated by the pressure sensor 56. By setting the predetermined value in this way, the smartphone 10 does not need to perform GPS positioning more than necessary due to an influence of the local maximum value or the local minimum value of a seeming altitude caused by variation of the atmospheric pressure value measured every time by the pressure sensor 56.

Further, altitude data acquired in the processing of step S107 has already changed a predetermined value from the local maximum or the local minimum value, so that it is possible to acquire a more accurate altitude value by correcting the acquired altitude value by this predetermined value.

As described above, the altitude information acquiring system 1 according to the second embodiment acquires an altitude value by way of GPS positioning only when the altitude calculated based on the atmospheric pressure acquired by the pressure sensor 56 changes a predetermined value or more from the local maximum value or the local minimum value. Consequently, it is possible to acquire the altitude value by way of GPS positioning only in the case where the altitude value calculated based on a measurement value of the pressure sensor 56 is considered as a local maximum value or a local minimum value with reliability.

Further, the electronic watch 40 also acquires an accurate altitude value itself by way of GPS positioning, so that it is possible to update a correction parameter of a model atmospheric pressure table 421. By this means, it is possible to more accurately provide a non-linear relationship between an atmospheric pressure and an altitude and, consequently, more accurately estimate a change to a predetermined value.

[Third Embodiment]

Next, an altitude information acquiring system 1 according to a third embodiment will be described.

A configuration of the altitude information acquiring system 1 according to the third embodiment is the same as the altitude information acquiring system according to the first embodiment and the second embodiment, and thus the same reference numerals are assigned and detailed description is omitted.

Figure 11:
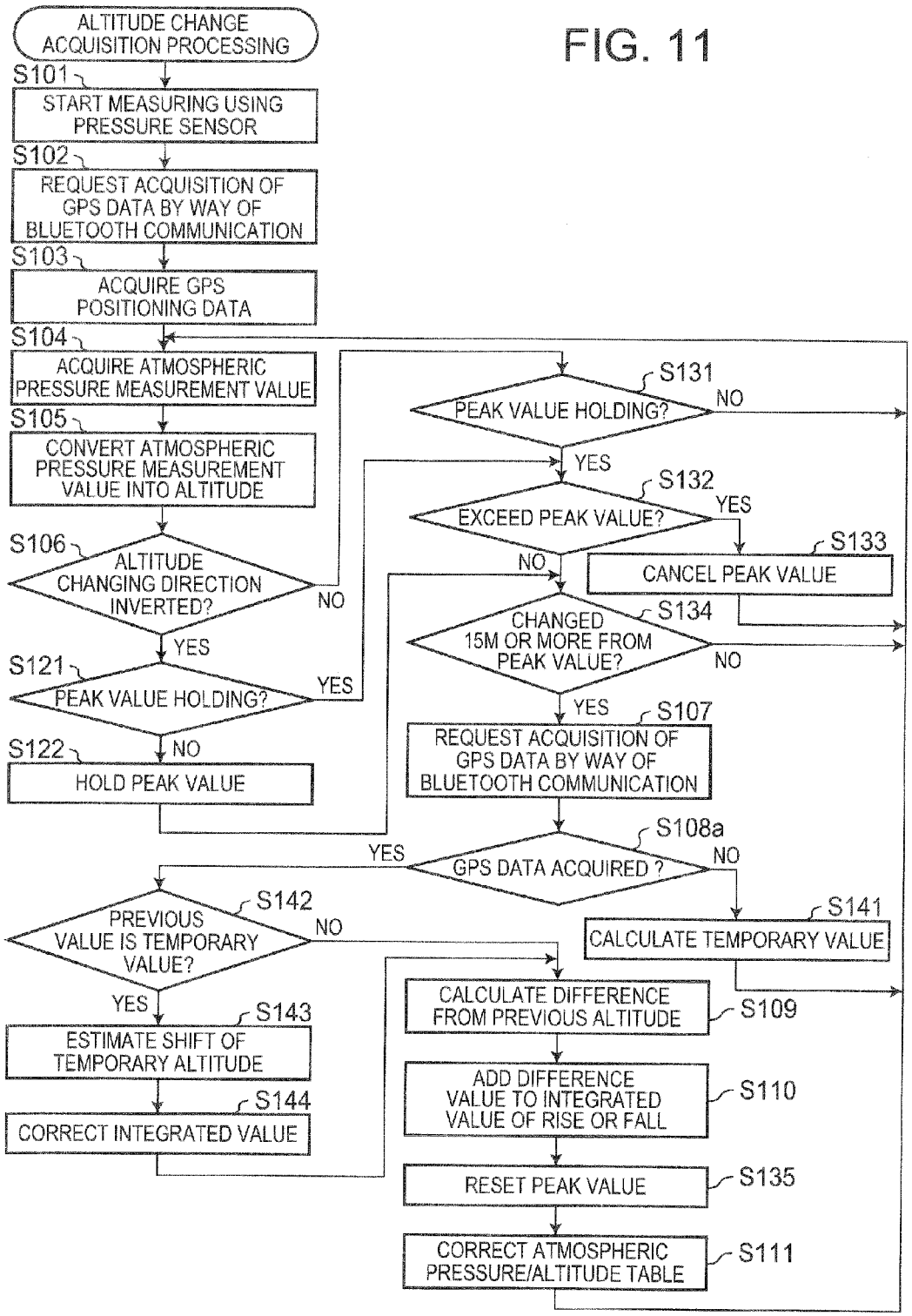
FIG. 11 is a flowchart illustrating control procedure of altitude change acquisition processing according to a third embodiment.

FIG. 11 is a flowchart illustrating control procedure of a CPU 41 in altitude change acquisition processing executed by an electronic watch 40 of the altitude information acquiring system 1 according to the third embodiment.

The altitude change acquisition processing executed in the electronic watch 40 according to the third embodiment differs from altitude change acquisition processing executed in an electronic watch 40 according to the second embodiment in that processing of steps S141 to S144 is further added and the processing of step S108 is changed to processing of step S108a. The other processing is the same, and thus the same reference numerals are assigned and detailed description is omitted.

In this altitude change acquisition processing, when a smartphone 10 cannot acquire GPS data which the electronic watch 40 requests to acquire in step S107, processing using temporary data is performed. When the processing of step S107 is performed, a CPU 41 next decides whether or not normal GPS positioning data is acquired from the smartphone 10 (step S108a). When it is decided that the normal GPS positioning data is not acquired, that is, when a signal indicating a reception error of GPS data is received, the CPU 41 calculates an amount of altitude change (difference value) using an altitude value calculated by a pressure sensor 56 as the temporary value in this case, and adds the amount of altitude change to a rise altitude integrated value or a fall altitude integrated value (step S141). The CPU 41 stores the temporary altitude value used in this case, the difference value and an altitude value measured at the previous GPS positioning in association with each other in an altitude change memory unit 431. The processing of the CPU 41 then goes to step S104.

When it is decided in the determination processing of step S108a that the normal GPS positioning data was received, the CPU 41 next decides whether or not the altitude value used for updating the integrated altitude value at the previous time was a temporary value (step S142). When it is decided that the altitude value was not a temporary value, the processing of the CPU 41 goes to step S109 and normal processing is performed. When it is decided that the previous altitude value was a temporary value, the CPU 41 performs processing of correcting the previous temporary altitude value based on the altitude value obtained by current PGS positioning and the altitude value obtained by previous GPS positioning. More specifically, the CPU 41 linearly interpolates or extrapolates a degree of shift between an altitude difference between the previous and current GPS positionings and an altitude difference between the previous GPS positioning altitude and the current altitude value based on the measurement of the pressure sensor 56, and estimates the GPS positioning altitude corresponding to the temporary altitude value (step S143). The CPU 41 makes correction by adding the shift obtained by correcting the temporary altitude value to the estimated GPS positioning altitude to an integrated altitude (step S144). After this correction processing is terminated, the CPU 41 calculates previous and current altitude value changes as usual using the altitude value estimated in the processing of step S143, and adds the altitude value changes to the integrated altitude value (steps S109 and S110).

As described above, with the altitude change acquisition processing according to the third embodiment, even when the smartphone 10 could not perform GPS positioning due to a forest zone or a shade of a building, upon being requested to perform GPS positioning, the electronic watch 40 temporarily updates an integrated altitude value using an altitude value based on the measurement value of the pressure sensor 56. And when GPS positioning is performed after that, it is possible to correct the temporary value based on the previous GPS positioning and the current GPS positioning. Consequently, it becomes possible to perform accumulative calculation for more accurate integrated altitude values.

In addition, the present invention is by no means limited to the above embodiments, and can be variously modified.

Although, for example, the smartphone 10 is used as a positioning device in the above embodiments, another device may be used as long as the device can be carried by the user together with the electronic watch 40. For example, a mobile telephone, a PDA (Personal Digital Assistant) and a dedicated mobile GPS positioning device may be used.

Further, although Bluetooth communication has been described as an example of near field communication in the above embodiments, other communication standards may be used. For example, UWB (Ultra Wide Band) and infrared communication may be used.

Further, when GPS positioning succeeded, the positioning data is simply used as is in the above embodiments. However, when positioning precision is lower than a reference level set in advance due to a slope or a shadow of a building, for example, it may be determined to perform the same processing as in a case that GPS positioning fails.

Furthermore, although a measurement value of the pressure sensor 56 is used as is in the above embodiments, for example, a variation error may be suppressed using, for example, a moving average of predetermined times.

Still further, even when the smartphone 10 failed GPS positioning which the electronic watch 40 requested, GPS positioning is not performed in the above embodiments until the electronic watch 40 makes the next request. However, a predetermined time interval may be set in advance and the smartphone 10 may intermittently try GPS positioning. In this case, the smartphone 10 may transmit data to the electronic watch 40 when GPS positioning succeeded, or the electronic watch 40 may make a request of GPS positioning separately from a normal GPS positioning request to the smartphone 10 at the predetermined time interval.

Additionally, specific configurations, orders, numerical values and details described in the above embodiments can be adequately changed within a scope which does not deviate from the spirit of the present invention.

What is claimed is:

1. An altitude information acquiring device comprising:
   a measuring unit which periodically measures atmospheric pressure;
   a wireless communication unit which performs near field communication with an external device;
   an altitude information acquiring unit which acquires altitude information from an external positioning device through the wireless communication unit;
   an inversion detecting unit which detects a reversal of a changing direction, which is a direction in which the atmospheric pressure periodically measured by the measuring unit is changing;
   an altitude calculating unit which converts atmospheric pressure values measured by the measuring unit into altitude values based on a predetermined table;
   a communication control unit which sets a timing to acquire the altitude information through the wireless communication unit to a timing at which, after the reversal of the changing direction, an altitude change in the changing direction after the reversal is a preset altitude difference or more; and
   an integrated altitude change acquiring unit which acquires a rise altitude integrated value obtained by integrating an amount of altitude change in a rising direction and a fall altitude integrated value obtained by integrating an amount of altitude change in a falling direction, based on the acquired altitude information.

2. The altitude information acquiring device according to claim 1, wherein the altitude information acquiring unit acquires the altitude information at the timing when the changing direction of the atmospheric pressure was reversed, by correcting the acquired altitude information with the preset altitude difference.

3. The altitude information acquiring device according to claim 1, wherein the altitude calculating unit calculates the altitude by correcting the predetermined table based on the acquired altitude information.

4. The altitude information acquiring device according to claim 2, wherein the altitude calculating unit calculates the altitude by correcting the predetermined table based on the acquired altitude information.

5. The altitude information acquiring device according to claim 1, wherein:
the altitude information acquiring unit calculates a temporary value related to the altitude information based on the altitude value calculated by the altitude calculating unit when the altitude information acquiring unit fails to acquire the altitude information from the positioning device, and
when the altitude information acquiring unit successfully acquires the altitude information from the positioning device upon or after the calculation of the temporary value, the altitude information acquiring unit corrects the temporary value based on the altitude information currently acquired and the altitude information previously acquired from the positioning device.

6. The altitude information acquiring device according to claim 2, wherein:
the altitude information acquiring unit calculates a temporary value related to the altitude information based on the altitude value calculated by the altitude calculating unit when the altitude information acquiring unit fails to acquire the altitude information from the positioning device, and
when the altitude information acquiring unit successfully acquires the altitude information from the positioning device upon or after the calculation of the temporary value, the altitude information acquiring unit corrects the temporary value based on the altitude information currently acquired and the altitude information previously acquired from the positioning device.

7. The altitude information acquiring device according to claim 1, wherein:
the altitude information acquiring unit acquires an altitude value at the timing to acquire the altitude information as the altitude information, and
the integrated altitude change acquiring unit updates the rise altitude integrated value or the fall altitude integrated value based on a difference between a previously acquired altitude value and the currently acquired altitude value.

8. The altitude information acquiring device according to claim 3, wherein:
the altitude information acquiring unit acquires an altitude value at the timing to acquire the altitude information as the altitude information, and
the integrated altitude change acquiring unit updates the rise altitude integrated value or the fall altitude integrated value based on a difference between a previously acquired altitude value and the currently acquired altitude value.

9. The altitude information acquiring device according to claim 2, wherein:
the altitude information acquiring unit acquires an altitude value at the timing to acquire the altitude information as the altitude information, and
the integrated altitude change acquiring unit updates the rise altitude integrated value or the fall altitude integrated value based on a difference between a previously acquired altitude value and the currently acquired altitude value.

10. The altitude information acquiring device according to claim 1, wherein the altitude information comprises a value of altitude change from a timing that the altitude information was previously acquired from the positioning device through the communication control unit to the timing that the altitude information is currently acquired.

11. The altitude information acquiring device according to claim 3, wherein the altitude information comprises a value of altitude change from a timing that the altitude information was previously acquired from the positioning device through the communication control unit to the timing that the altitude information is currently acquired.

12. The altitude information acquiring device according to claim 2, wherein the altitude information comprises a value of altitude change from a timing that the altitude information was previously acquired from the positioning device through the communication control unit to the timing that the altitude information is currently acquired.

13. The altitude information acquiring device according to claim 1, wherein the altitude information comprises the rise altitude integrated value and the fall altitude integrated value calculated by the positioning device.

14. The altitude information acquiring device according to claim 3, wherein the altitude information comprises the rise altitude integrated value and the fall altitude integrated value calculated by the positioning device.

15. The altitude information acquiring device according to claim 2, wherein the altitude information comprises the rise altitude integrated value and the fall altitude integrated value calculated by the positioning device.

16. The altitude information acquiring device according to claim 13, further comprising an initial value setting unit which transmits initial values of the rise altitude integrated value and the fall altitude integrated value to the positioning device by the wireless communication unit when the measuring unit starts measuring the atmospheric pressure.

17. An altitude information acquiring system comprising:
a positioning device which comprises (i) an altitude acquiring unit which acquires an altitude of a current position, and (ii) an external wireless communication unit which transmits altitude information based on the altitude of the current position acquired by the altitude acquiring unit; and
the altitude information acquiring device according to claim 1,
wherein the altitude acquiring unit acquires altitude data included in the current position calculated by receiving radio waves from a plurality of positioning satellites according to a request from the altitude information acquiring device.

18. An altitude information acquiring system comprising:
a positioning device which comprises (i) an altitude acquiring unit which acquires an altitude of a current position, (ii) an external wireless communication unit which transmits altitude information based on the altitude of the current position acquired by the altitude acquiring unit, (iii) an altitude history memory unit which stores latest altitude data acquired by the altitude acquiring unit, and (iv) an amount of altitude change calculating unit which calculates an amount of altitude change from an altitude stored in the altitude history memory unit to a currently and newly acquired altitude; and
the altitude information acquiring device according to claim 10, wherein the external wireless communication unit transmits the amount of altitude change calculated by the amount of altitude change calculating unit to the altitude information acquiring device.

19. An altitude information acquiring system comprising:
a positioning device which comprises (i) an altitude acquiring unit which acquires an altitude of a current position, (ii) an external wireless communication unit which transmits altitude information based on the altitude of the current position acquired by the altitude acquiring unit, (iii) an altitude history memory unit which stores latest altitude data acquired by the altitude acquiring unit, and (iv) an amount of altitude change calculating unit which calculates an amount of altitude change from an altitude stored in the altitude history memory unit to a currently and newly acquired altitude; and
the altitude information acquiring device according to claim 13, wherein:

the altitude history memory unit stores a rise altitude integrated value which is an integrated value of an amount of altitude change in a rising direction and a fall altitude integrated value which is an integrated value of an amount of altitude change in a falling direction, the amount of altitude change calculating unit adds the amount of altitude change to one of the rise altitude integrated value and the fall altitude integrated value according to a sign of the calculated amount of altitude change, and the external wireless communication unit transmits the rise altitude integrated value and the fall altitude integrated value as the altitude information to the altitude information acquiring device.

* * * * *